June 2, 1931.  W. G. HAGENS  1,808,654
POISON OR POWDER DISTRIBUTOR
Filed March 20, 1930  4 Sheets-Sheet 1
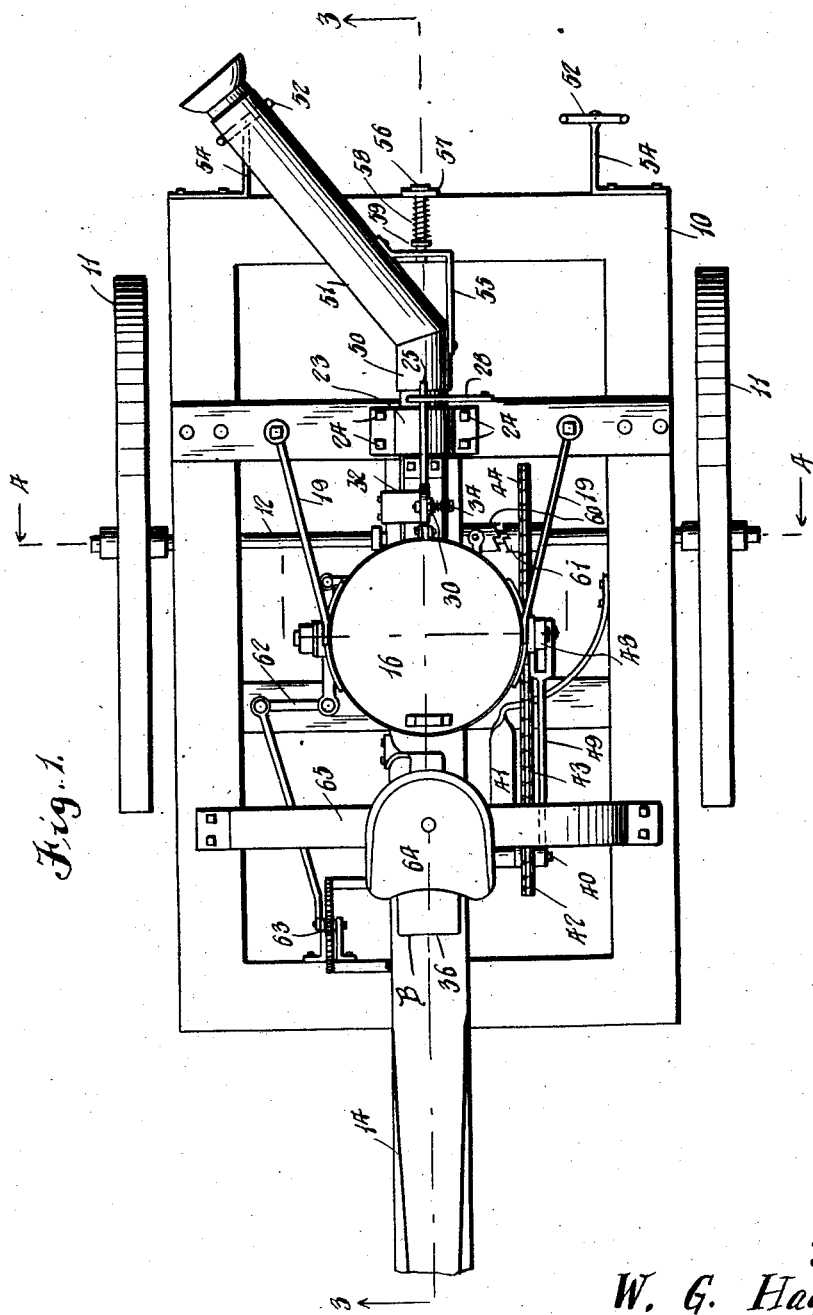

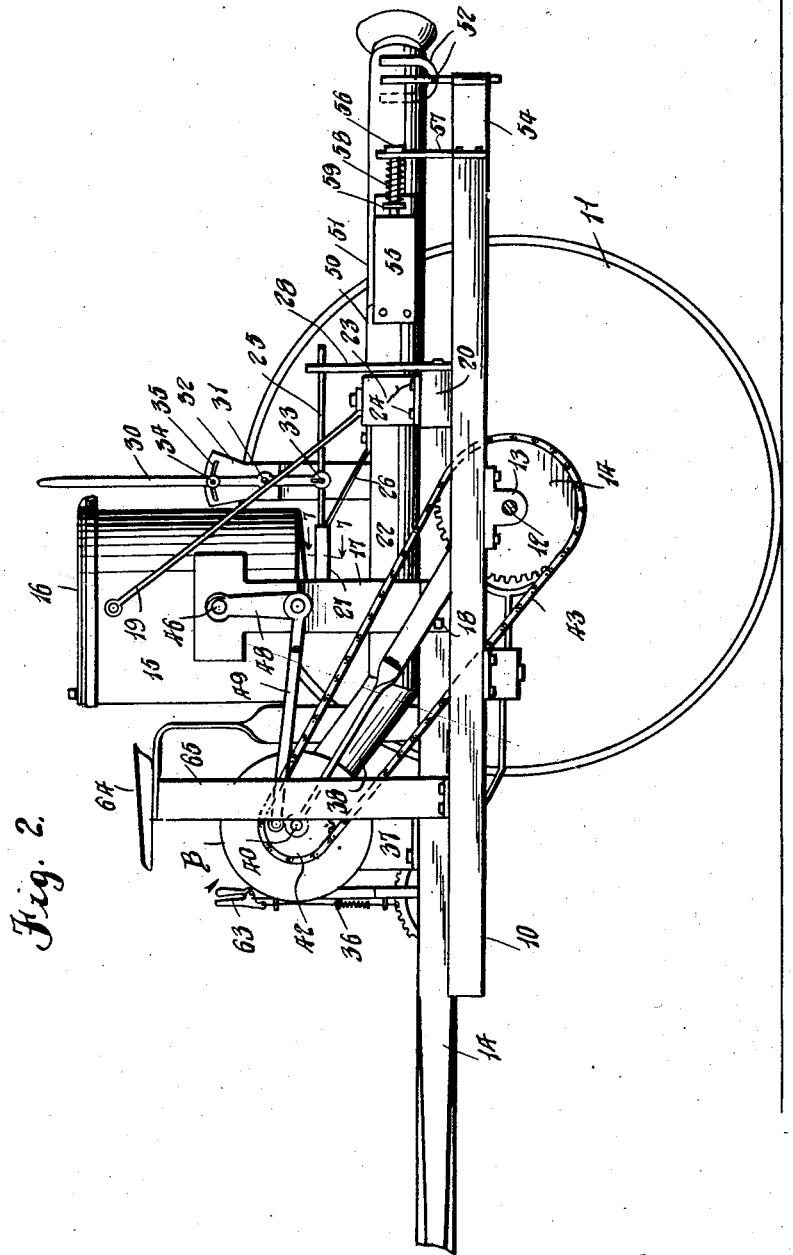

June 2, 1931. W. G. HAGENS 1,808,654
POISON OR POWDER DISTRIBUTOR
Filed March 20, 1930 4 Sheets-Sheet 3
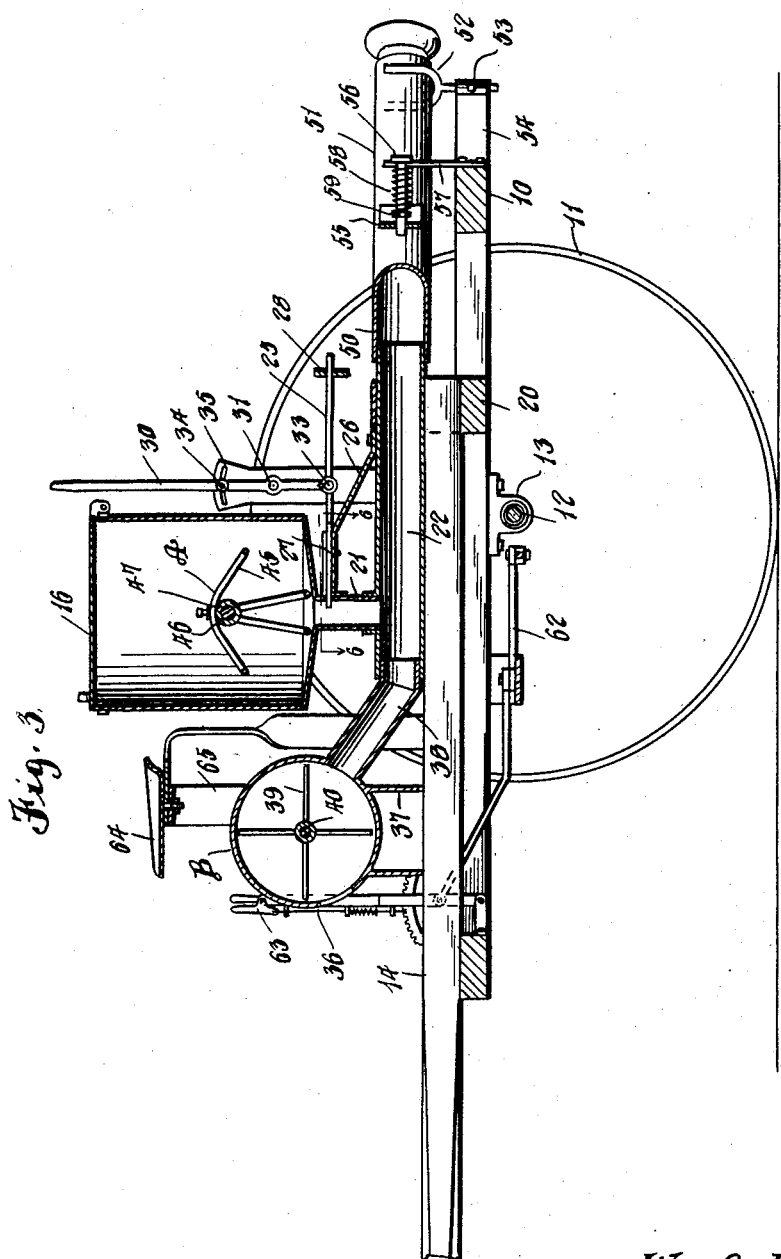
Inventor
W. G. Hagens
By L. F. Randolph Jr.
Attorney

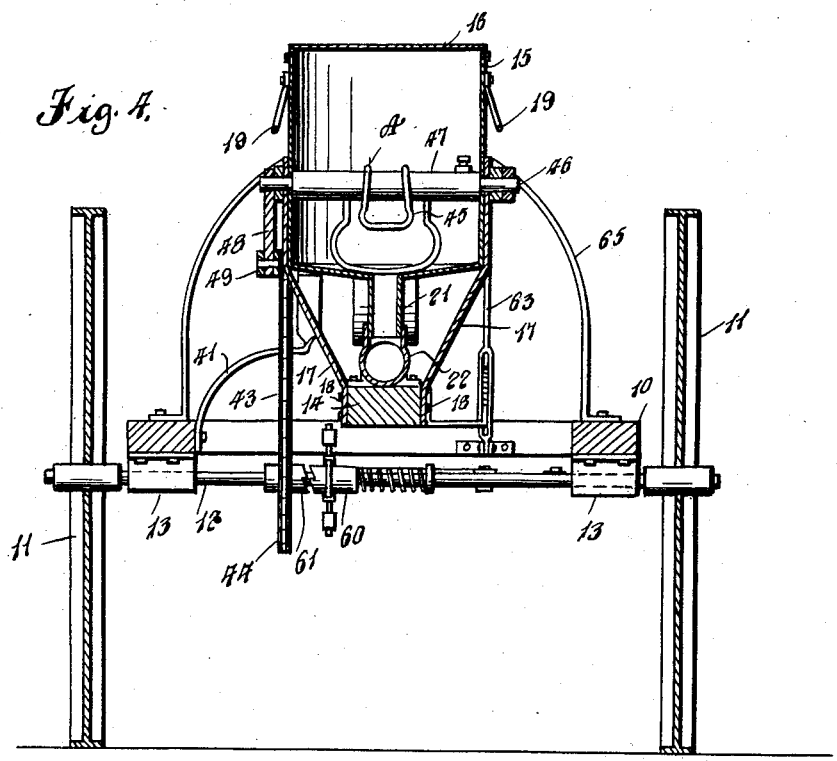
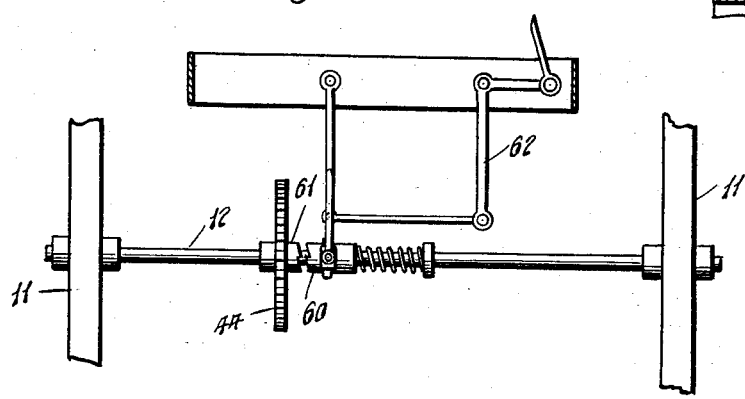
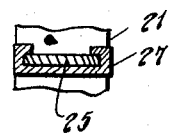
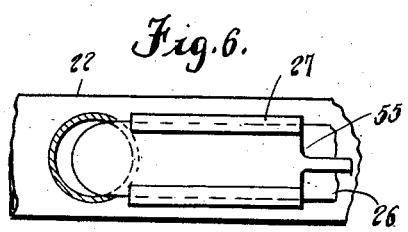

Patented June 2, 1931

1,808,654

UNITED STATES PATENT OFFICE

WALTER G. HAGENS, OF NEAR YOAKUM, TEXAS

POISON OR POWDER DISTRIBUTOR

Application filed March 20, 1930. Serial No. 437,494.

This invention relates to a machine for distributing poison or powder over vegetation.

It is aimed to provide a novel construction wherein a blower is used and operated by power derived from the ground wheels thereof.

Another object is to provide a novel construction wherein the discharge pipe or nozzle is adjustable laterally and vertically so that the blast may be directed as desired.

Still further it is aimed to proivde a novel construction wherein a positively driven agitator is used in the hopper.

Various additional objects and advantages will become apparent from a consideration of the description following taken in connection with accompanying drawings illustrating an operative embodiment.

In said drawings:

Figure 1 is a plan view of the machine,

Figure 2 is a side elevation thereof,

Figure 3 is a central longitudinal sectional view taken on the line 3—3 of Figure 1, Figure 4 is a transverse sectional view taken on the line 4—4 of Figure 1, Figure 5 is a fragmentary rear view, Figure 6 is a detail sectional view taken on the line 6—6 of Figure 3, and Figure 7 is a cross sectional detail taken on the line 7—7 of Figure 2.

Referring specifically to the drawings, the machine may have a suitable frame 10, rectangular as shown, or otherwise supported on ground wheels 11 rigid with an axle 12 journaled in bearings 13 secured to the frame. The machine may be drawn by an animal or tractor as preferred, for instance having a draft tongue at 14 secured centrally to the frame 10.

Located above the frame 10 substantially centrally is a hopper 15, which may be round, square or any preferred shape or size and which is adapted to be filled with the poison, powder or material to be distributed, the hopper having a hinged closure 16 at the top. The hopper may be mounted in any suitable manner but as shown a pair of brackets 17 are secured to the sides thereof and to the sides of the draft tongue 14, in the latter instance bolts 18 being used. Braces 19 may extend from the hopper to a cross bar 20 surmounted on the frame 10. Said hopper has a central discharge chute 21 which is arranged in communication with a discharge duct 22 which rests on the rear end of the tongue 14 or other part of the frame, on the cross bar 20 and being secured to the latter by a clamp plate 23 bolted at 24 thereto. The discharge of material from the hopper 15 through the chute 21 is controlled by a valve plate 25 which is slidably mounted by a bracket 26 which may be integral with the clamp 23, such bracket having flanges 27, Figure 6, which guide the plate 25 and a bracket 28, rising from the cross bar 20 having a slot which also guides such valve plate 25. Such plate 25 may be moved or adjusted in any suitable way, for instance through the actuation of a hand lever 30 pivoted as at 31 to a bracket 32 mounted on the frame 10 and which lever has a pin and slot connection as at 33 with the valve plate 25. In order to secure the lever 30 in different adjusted positions, it has a bolt 34 coacting with an arcuate slot 35 provided in bracket 32.

Supported on the frame 10 adjacent the front thereof is a blower B having a casing 36 which is rigidly mounted as by supporting means 37. Such blower casing has a discharge duct 38 in communication with that at 22. Also operable within the blower 36 is a fan 39 whose shaft is designated 40 and extends to the exterior of the casing, where its support is augmented by a bearing arm or bracket 41 secured to the frame 10. A sprocket wheel 42 is keyed to shaft 40 and has a sprocket chain 43 keyed thereover which also traverses a sprocket wheel 44 adapted to be driven by the shaft or axle 12. Thus it will be seen that operation of the machine will drive the blower and cause it to exert a suction on duct 22 to effect the discharge of powder.

An agitator A for the powder is located within the hopper having arms 45 of irregular form carried by a sleeve 46 fastened to a shaft 47. Such shaft 47 is journaled in the walls of the hopper and in the brackets 17 and exteriorly thereof has a crank arm 48 to which a pitman 49 is pivoted which is also eccentrically pivoted to the sprocket wheel 42. Thus as the blower operates, the agitating means A will also be operated.

Turnable or swivelled on the rear end of the duct 22 is a nipple 50 of a discharge pipe or nozzle 51, the main portion of which is preferably inclined as shown in Figure 1. Portion 51 is adapted to rest selectively in forks 52 located at opposite sides of the rear of the frame 10, such forks being vertically adjustable and adapted to be secured in adjusted position by means of screws 53 carried by brackets 54 which mount the forks and which brackets are secured to the frame 10. In order that the nozzle 51 may be efficiently pivotally mounted for the said movement, a bracket 55 is secured thereto and a pin 56 is journaled in the same and extends from an upright mounting 57 on the frame 10. An expansive spring 58 surrounds the rod 56, abuts the member 57 and an abutment 59 on the rod 56 in order to hold the same in place.

The aforesaid wheel 44 is normally loose on the shaft 12 and is adapted to be driven therefrom by moving a clutch 60, which is slidable on but rotatable with the shaft 12, into engagement with a clutch 61 carried by said wheel 44. Any suitable means may be provided to control the operation of the movable clutch member 60 for instance a system of links and levers 62 under control of a lever 63 adjacent to the operator's seat 64, the latter being supported by uprights 65 secured to frame 10 adjacent the blower B.

I claim as my invention:—

1. In a machine of the class described, a distributing nozzle, a duct to supply the material thereto, said nozzle being swiveled on said duct and having a portion deflected with respect to the duct, a frame supporting the duct, means on the frame at spaced locations for engagement by said deflected portion, a bracket on said duct, and a pin engaging the bracket and said frame arranged coxially with the duct to serve as a pivot upon which the nozzle may be swung.

2. In a machine of the class described, a distributing nozzle, a duct to supply the material thereto, said nozzle being movable on the axis of said duct and arranged to discharge laterally of said axis, a frame supporting the duct, and means on the frame coacting with the nozzle forming a bearing therefor along said axis.

In testimony whereof I affix my signature.

WALTER G. HAGENS.